US011659851B2

(12) United States Patent
Lombardo et al.

(10) Patent No.: US 11,659,851 B2
(45) Date of Patent: May 30, 2023

(54) RF PROCESS FOR TREATING SEASONING COMPONENTS

(71) Applicant: McCormick & Company, Incorporated, Hunt Valley, MD (US)

(72) Inventors: Stephen Lombardo, Baltimore, MD (US); Thao Xuan Ngo, Lutherville, MD (US); William Conway, Baltimore, MD (US); Matthew John Giannelli, Bel Air, MD (US)

(73) Assignee: MCCORMICK & COMPANY, INCORPORATED, Hunt Valley, MD (US)

( * ) Notice: Subject to any disclaimer, the term of this patent is extended or adjusted under 35 U.S.C. 154(b) by 0 days.

(21) Appl. No.: 16/098,603

(22) PCT Filed: May 3, 2017

(86) PCT No.: PCT/US2017/030785
§ 371 (c)(1),
(2) Date: Nov. 2, 2018

(87) PCT Pub. No.: WO2017/192683
PCT Pub. Date: Nov. 9, 2017

(65) Prior Publication Data
US 2019/0116837 A1    Apr. 25, 2019

Related U.S. Application Data

(60) Provisional application No. 62/331,579, filed on May 4, 2016.

(51) Int. Cl.
*A23L 3/005* (2006.01)
*A23L 27/10* (2016.01)
*A23L 27/14* (2016.01)

(52) U.S. Cl.
CPC .............. *A23L 3/005* (2013.01); *A23L 27/10* (2016.08); *A23L 27/14* (2016.08); *A23V 2002/00* (2013.01)

(58) Field of Classification Search
CPC . A23L 3/00; A23L 3/005; A23L 27/14; A23B 9/00; A23B 9/04
See application file for complete search history.

(56) References Cited

U.S. PATENT DOCUMENTS

| | | | |
|---|---|---|---|
| 6,086,936 A | 7/2000 | Wilson et al. | |
| 6,638,475 B1 | 10/2003 | Lagunas-Solar | |
| 8,640,609 B2 * | 2/2014 | De Heij | A23L 3/01 99/451 |
| 9,120,587 B2 * | 9/2015 | Pesce | A23L 3/001 |
| 2002/0047009 A1 | 4/2002 | Flugstad et al. | |
| 2005/0287254 A1 | 12/2005 | Radatti | |
| 2006/0024195 A1 | 2/2006 | Lagunas-Solar et al. | |
| 2011/0177216 A1 | 7/2011 | Weaver et al. | |
| 2012/0164022 A1 | 6/2012 | Muginstein et al. | |

FOREIGN PATENT DOCUMENTS

| | | |
|---|---|---|
| CN | 1545823 A | 11/2004 |
| CN | 102711486 A | 10/2012 |
| JP | A-2013-517004 | 5/2013 |
| RU | 2030893 C1 | 3/1995 |
| RU | 2174361 C2 | 10/2001 |
| RU | 2312562 C2 | 12/2007 |
| RU | 2535625 C1 | 12/2014 |
| SU | 1734632 A1 | 5/1992 |
| WO | WO2011/091156 | 7/2011 |

OTHER PUBLICATIONS

Schweiggert et al., Conventional and alternative processes for spice production (Year: 2007).*
Kawachi et al., Microbial Reduction and Quality Changes in Powdered White and Black Pepper by Treatment with Compressed Oxygen or Carbon Dioxide Gas (Year: 2015).*
Palgan et al., New technologies for pasteurization of low water activity food (Year: 2015).*
Sung-Youn et al., "Radio-frequency heating to inactivate *Salmonella typhimurium* and *Escherichia coli* O157:H7 on black and red pepper spice", International Journal of Food Microblology, vol. 153, No. 1-2, Feb. 2012, pp. 171-175.
Jeong et al., "Influence of moisture content on inactivation of *Escherichia coli* O157:H7 and *Salmonella enterica serovar Typhimurium* in powder red and black pepper spices by radio frequency heating", International Journal of Food Microblology, vol. 176, No. 1-2, 2014, pp. 15-22.
Official Communication issued in International Bureau of WIPO Patent Application No. PCT/US2017/30785, dated Aug. 7, 2017.
Official Communication issued in European Patent Office (EPO) Patent Application No. 17793230.8, dated Sep. 18, 2019.
European Patent Office (EPO) Office Action, dated May 13, 2020, in European Patent Application No. 17 793 230.8.
Japanese Office Action issued in JP Application No. 2018-557856 dated Nov. 10, 2020.
Australian Examination Report issued in application No. 2017260335, dated Oct. 15, 2020.
Russian Office Action, dated Jul. 23, 2020, in Russian Patent Application No. 2018142017 with English translation.
Russian Search Report dated Jul. 22, 2020, in Russian Patent Application No. 2018142017.

(Continued)

*Primary Examiner* — Erik Kashnikow
*Assistant Examiner* — Lela S. Davis
(74) *Attorney, Agent, or Firm* — Greenblum & Bernstein, P.L.C.

(57) ABSTRACT

An RF process for treating seasoning components. An efficient process for treating seasoning components is described, including exposing the components to RF radiation to elevate the temperature of the components substantially uniformly throughout the components to a level sufficient to eliminate harmful microbes while substantially preserving organoleptic properties.

22 Claims, No Drawings

(56) References Cited

OTHER PUBLICATIONS

European Office Action issued in EP Application No. 17 793 230.8-1106 dated Jan. 27, 2021.
Russian Office Action issued in Russia Application No. 2018142017 dated Jun. 16, 2021 with English translationRU2174361.
English translation of Nov. 16, 2021 Publication of Brazilian Preliminary Office Action Report Related to Patent Application No. BR112018072582-0 family member.
Australian Office Action issued in Australian Application No. 2017260335 dated Sep. 22, 2021.
Japanese Office Action issued in Japanese Application No. 2018-557856 dated Oct. 5, 2021, and English machine translation thereof.
May 12, 2022 Office Action in family member Mexican Application No. Mx/a/2018/013365 and Google® machine English translation thereof.
Chinese Office Action issued in Chinese Patent Application No. 201780027694.X dated Nov. 2, 2021, and English machine translation thereof.
Apr. 13, 2022 Office Action in family member Chinese Application No. 201780027694.X and machine English translation thereof.
Apr. 5, 2022 Decision to Grant in family member Japanese Application No. 2018-557856 and machine English translation thereof.
Dec. 22, 2022 "Examination Report No. 1 for standard patent application" in family member Australian Application No. 2021250959.
Feb. 21, 2023 Office Action in family member Canadian Patent Application No. 3,022,943.

* cited by examiner

RF PROCESS FOR TREATING SEASONING COMPONENTS

CROSS-REFERENCE TO RELATED APPLICATION

This application claims the benefit of U.S. Provisional Application No. 62/331,579, filed May 4, 2016, which is entirely incorporated herein by reference.

TECHNICAL FIELD

The field of art to which this invention generally pertains is the processing of food components, and especially herbs and spices.

BACKGROUND

The consumption of safe food items is a key concern, not only for the everyday consumer, but for governments, food manufacturers, food handlers, and especially for food service vendors, sellers and distributors. In addition to the primary concern for the health and well-being of the general public, the economic damage, and significant reputational damage and breach of trust to any individuals or organizations associated with unsafe food can be devastating. So while the costs associated with the whole supply chain surrounding the production and delivery of safe food products can be high, the benefit-to-cost ratio for the resources invested in such efforts is obvious, and can't be ignored, even if there were a desire to.

Accordingly, as with other commercial processes, there is a constant search for the most efficient and cost effective ways to attain food safe products.

BRIEF SUMMARY

A process for treating seasoning components is described, including exposing the components to RF radiation to elevate the temperature of the components substantially uniformly throughout the components to a level sufficient to eliminate harmful microbes while preserving organoleptic properties.

Additional embodiments include: the process described above where the seasoning components are spices; the process described above where the seasoning components are herbs; the process described above where the seasoning components are in seed form; the process described above where the seeds are cracked; the process described above where the seeds are peppercorn; the process described above where the seasoning component is selected from the group consisting of black pepper, white pepper, red chili, paprika, coriander, basil, parsley, cilantro, oregano, garlic, onion, rosemary, dill, tomato, cheese, pepper, nutmeg, and mustard; the process described above where the seasoning component is ground; the process described above where the seasoning component is whole; the process described above where the seasoning component is dry; the process described above where the seasoning component is wet; the process described above where the seasoning component is porous; the process described above where the seasoning component before exposure to the RF radiation has a moisture content of up to about 50% by weight; the process described above where the seasoning component before exposure to the RF radiation has a moisture content of up to about 10% by weight; the process described above where the seasoning component before exposure to the RF radiation has moisture content of about 5% to about 10% by weight; the process described above where the seasoning component before exposure to the RF radiation has moisture content below 5%; the process described above where the seasoning component is ground or whole black pepper; the process described above where the RF radiation is about 30 kw to about 300 kw; the process described above where the temperature is about 170° F. to about 260° F.; the process described above where the water activity of the seasoning component is 0.4 to 0.99; the process described above where the seasoning component is held at temperature from 30 seconds to 1 hour; the process described above where the microbe is *Salmonella*; the process described above where the microbes include yeast, mold, coliforms, SPC (Standard Plate Count, which is an approximation of the number of mesophilic aerobic bacteria in a sample. The approximation is based on the assumption that each cell or cluster of cells will form a visible colony forming unit (CFU) when plated on agar and incubated. SPC is used as a general quality indicator but is more meaningful for some foods than others. For example, the SPC of raw agricultural products varies dramatically and may not be related to quality. For other foods such as seafood, a high SPC might indicate poor sanitation, process upset or end of shelf-life) and/or spore-formers; and the process described above where the spore-formers are *Bacillus cereus* and/or *Clostridium perfringens*.

These, and additional embodiments, will be apparent from the following descriptions.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

A process for treating seasoning components is described, including exposing the components to RF radiation. In addition to other effects, this treatment is controlled so as to elevate the temperature of the components substantially uniformly throughout the components. This is performed to a level sufficient to eliminate harmful microbes, such as pathogens, yeast, mold, coliforms and other bacteria, while preserving organoleptic properties.

The treatment of food products with RF radiation for food safety reasons has been attempted in the past. See, for example, U.S. Pat. Nos. 9,120,587; 8,640,609; 6,638,475; and 8,808,773, the disclosures of which are incorporated by reference herein. Seasoning components, like herbs and spices, however, require special treatment. Even temperatures throughout the product are required to produce food safe products, while maintaining their organoleptic properties. For example, the holding times for pepper, must be adequate to destroy microbes without otherwise damaging the resultant product. Some examples of these seasoning components which would require such special treatment and handling include, for example, herbs and spices in general, black pepper, white pepper, red chili, paprika, seasoning components in seed form, coriander seeds, peppercorn, herbs, basil, parsley, cilantro, oregano, garlic, onions, rosemary, dill, tomato, cheese, peppers, mustard seed, etc.—basically any ingredient which can go into seasonings, dry or wet. And, as mentioned above, the times, temperatures, power levels used, etc. is very specific to the seasoning component being treated, again to accomplish the primary objective of harmful microbe elimination, without damage to organoleptic properties, and with processing conditions that are not cost prohibitive, especially from a commercial perspective. Based on the numbers generated with specific materials (e.g., see the Examples), it is possible to predict the treatment parameters for other seasoning components, for example, based on their relative heat capacity, specific heat, bulk density, particle size, dielectric characteristic, physical properties, thermal conductivity, etc. In addition, processing must typically be designed around commercially available equipment, such as that available from MACROWAVE™ Radio Frequency Company, for example.

As mentioned above, in addition to other processing conditions, time of treatment is one parameter which is particularly important. The shorter the time that the seasoning components have to be subjected to the RF microbe control processing, the better, for a variety of reasons—time and cost for commercial processing, preservation of organoleptic properties, just to name a few. Shorter time is better, especially for herbs and spices. The process parameters, such as heating rate, moisture content, geometry, etc. can and should be optimized to accomplish the even heating levels desired. And uneven heating can have adverse effects on the quality of the seasoning components.

While all harmful microbes (for example, Salmonella, yeast, mold, coliforms, etc.) are targets of the processes described herein, Salmonella is particularly targeted because of its known harmful effects. It is also, fortunately, one of the easiest to control by the RF treatments described herein. So with the right time and temperature treatment conditions, it can be completely eliminated from the seasoning components described herein.

As mentioned above, preservation of organoleptic properties is an important aspect of the process described herein. Preservation of appearance (color) and flavor (flavor components such as volatile oils) are key for consumer acceptance. Ideally, there should be undetectable adverse appearance and flavor impact on the seasoning components detectable by consumers, while eliminating the unwanted microbes through the RF processing. Because of commercial considerations, automated control of the process is also desirable. Such control is important for production since the process needs to be managed on the production floor easily.

Maximizing efficiency of equipment and other resources, along with reducing down time, has obvious production advantages as well. Process controls based on seasoning component temperatures coming in, going out, and during RF treatment, moisture content, sets of parameters for components with the same or similar density, belt speeds, quantity of product being treated, particle size, for example, are just a few examples of check points which could be established for automating RF treatment. These can be tied to conventional process or system relays and controls, to control the machinery and keep the system working efficiently.

While a range of RF power settings can be used (e.g., about 20 MHz to about 2000 MHz), as mentioned above, the temperature, water activity (the ratio of the equilibrium partial vapor pressure of water in a sample to the equilibrium vapor pressure of pure liquid water at that temperature) and time produced in the seasoning component are important process parameters, and this can depend on a variety of factors including the RF power settings on the conventional RF power equipment used, including time of treatment, distance of RF producing plates from each other and the seasoning component, density of the seasoning component, size and amount of component, moisture content of the seasoning component, dielectric property of the material, porosity of the material, wet or dry component, ground or whole component, etc. (addition of heated moisture, the presence or absence of oxygen from the process, e.g., running the RF process under a heated nitrogen blanket, can also be a factor, although the added cost and environmental controls of such a process could obviously add cost).

While there could be advantages to processing the seasoning components in a continuous bulk process (for example, running the components through a conventional RF processor on a conveyor belt prior to packaging), continuous in-package process processing, for example, after the seasoning components have been packaged, could have significant processing advantages. And the batches could be of significant volume as well, for example, components packaged in 25 pound bags or boxes. This could be particularly effective with packaged black pepper, for example. Care must be taken if the components are already packaged, to adjust processing conditions to avoid clumping of the product in the package, which could be especially true for such things as onion, garlic, and chili powder, for example.

The process described herein is especially useful for whole herbs and spices, such as whole or cracked seed products—peppercorns, for example. These products can then be milled after treatment, or sold as seed products, or use in small grinders, for example.

For the RF processing described herein, in general, it is advantageous for the seasoning components being treated to contain at least some moisture. For some materials, their natural moisture content is such that no adjustments are necessary to make any modifications in time, RF power levels, or any other process modifications. They carry enough moisture to be heated up uniformly and eliminate unwanted microbes without moisture content adjustment. For some, they are so dry in their natural state that moisture content adjustment can improve processing. For example, black pepper can be processed efficiently and effectively either in seed, cracked seed, or milled form without the necessity of any moisture adjustment. With many herbs, although they typically carry a 6 to 8 percent (by weight) moisture content, increasing the moisture content, for example by 1 or 2%, can improve processing (reduce time, e.g., faster heat up time, improve uniformity of heat treatment, etc.). Moisture can be added in any typical way, by water immersion, spray or mist, etc. (even up to as high as 50%) before RF treatment as described herein. While seasoning components with any degree of moisture can be processed as described herein, typically the moisture content of the seasoning components is adjusted to be up to about 10% for efficient processing, with time of treatment and RF power adjusted accordingly. For example, in general for a particular RF power setting, the lower the moisture content, the longer the time of RF exposure required to reach the temperatures (and uniformity of heating) within a component to attain effective microbe elimination and control. The amount of moisture can also affect the uniformity of the heating within the component as well.

Parsley and dill, for example, are known to have a relatively low moisture content of 4 to 5%. At levels up to 10% they work very well in the RF process. For most of the herbs, adding 5% moisture, on top of their already 4, 5 or 6% can significantly improve the efficiency of the process. Even with whole pepper, for some processing conditions, the addition of 2 or 3% moisture can reduce heating times to improved levels for commercially efficient processing, Although, black pepper seeds typically contain about 12% moisture, and even when milled still stay at that 12% moisture content.

Typically the processes described herein are run through RF equipment at power levels of about 30 kw (kilowatt) to about 300 kw (e.g., 30 kw, 40 kw, 50 kw, 60 kw, 70 kw, 80 kw, 90 kw, 100 kw, 110 kw, 120 kw, 130 kw, 140 kw, 150 kw, 160 kw, 170 kw, 180 kw, 190 kw, 200 kw, 210 kw, 220 kw, 230 kw, 240 kw, 250 kw, 260 kw, 270 kw, 280 kw, 290 kw, 300 kw). It has been found that these power levels can attain a uniform desired temperature, about 210° F. (e.g., about 170° F. to about 260° F., e.g., 170° F., 180° F., 190° F., 200° F., 210° F., 220° F., 230° F., 240° F., 250° F., 260° F.), for example, within the seasoning component in a reasonable amount of time (RF treatment for about 1 minute (min.) to 1 hour, e.g., 1 min., 2 min., 3 min., 4 min., 5 min., 6 min., 7 min., 8 min., 9 min., 10 min., 11 min., 12 min., 13 min., 14 min., 15 min., 16 min., 17 min., 18 min., 19 min., 20 min., 21 min., 22 min., 23 min., 24 min., 25 min., 26 min., 27 min., 28 min., 29 min., 30 min., 31 min., 32 min., 33 min., 34 min., 35 min., 36 min., 37 min., 38 min., 39 min., 40 min., 41 min., 42 min., 43 min., 44 min., 45 min., 46 min., 47 min., 48 min., 49 min., 50 min., 51 min., 52 min., 53 min., 54 min., 55 min., 56 min., 57 min., 58 min., 59 min., 60 min.) to support cost effective, microbe elimination for commercial production, for example. And of course, using the lower power levels, or with lower moisture content containing components, more time would be required to attain the same microbe eliminating conditions within the component.

Monitoring the temperature within the seasoning components is one of the easiest ways to control the process described herein. This can be done using conventional, commercially available equipment such as infrared thermal detection equipment, thermocouples or fiber optics, for example. And once the desired temperatures are attained, it is important to bring the temperature of the seasoning components back down or close to room temperatures (for example, to about 90° F.) again relatively quickly, balancing the cost of quick cooling against the time for overall processing. Bringing the components back down to temperature quickly also contributes to maintaining the quality of the components, especially for ground or more delicate components. Moving or blowing the air surrounding the components is one way of cooling the components, including the option of using cooled air. This is of course a delicate process with the herbs and spices, for example, being of relatively low density and high surface area. Another option is to pull a vacuum over the components after the RF treatment. This has the dual function of (evaporative) cooling as well as drying off moisture either naturally contained in the components, or any added moisture for processing. Drying and cooling can also be accomplished through use of fluidized bed technology or rotary drum drying technology. Again, the objective is to bring the RF treated components back down at or close to room temperature as quickly as reasonably possible for commercial processing.

It should be noted that the process is particularly well suited for botanical herbs, and spices, such as black and white pepper, because of their natural moisture content. Because these herbs and spices are typically processed fresh, moisture content has to be managed both before and after RF processing to insure shelf stability.

Once the seasoning components are subjected to RF processing, they are held at elevated temperature for certain times depending on what bacteria/microbes are trying to be eliminated. This holding time can be accomplished by treatment in an insulated treatment chamber, for example. Maintaining the temperature can also be assisted by heating the air blowing through the chamber. The total time for treatment would thus include the RF treatment time and the holding time. Holding times can depend on the temperature being maintained uniformly within the component and the amount of water or moisture or water activity the component is carrying. However, as mentioned above, the components should not be held at high temperatures for too long, since this could adversely impact organoleptic properties such as taste and appearance, for herbs and ground spices in particular. So the RF treatment should be as short as possible, and return to room temperature should be accomplished as quickly as possible after the microbes are eliminated. If the seasoning components are still in their shells, they would be more robust and would be less sensitive to longer times at higher temperatures, while ground herbs and spices would be more sensitive to adverse impacts on organoleptic properties at higher temperatures for too long. However, this is very component specific, for example, with such spices as white and black pepper being more process robust, even ground, than chilies in any form, which would be more sensitive.

As mentioned above, using RF energy to eliminate microbes is also an efficient way to generate heat within the seasoning components. But it is important to generate uniform heat throughout the components.

Successful use of the various processing conditions described above are selected based on the particular characteristics of the seasoning components, with components having similar characteristics being treated with similar conditions, including RF settings, timing, etc. Such characteristics include such things as component dielectric characteristic, physical properties, heat capacity, thermal conductivity, density, particle size, for example.

Example 1

Conventional ground black pepper packaged in a 20-40 pound bag and having a natural moisture content of 12-30% by weight is subjected to 15-45 kw of RF radiation in a conventional MACROWAVE RF generator for 2-5 minutes, attaining a temperature of about 170-240° F. It is held at this temperature for about 3-20 minute and then left standing in air to cool back down to room temperature. In addition to the elimination of the presence of any detectable *Salmonella* microbes, the pepper has organoleptic properties including flavor and appearance substantially the same as untreated ground black pepper.

Example 2

Conventional whole black peppercorns packaged in a 20-40 pound box and having a natural moisture content of 5-20% by weight is subject to 20-50 kW of RF radiation in a conventional MACROWAVE RF generator for 3-10 minutes, attaining a temperature of about 180-250 F. It is held at temperature for about 5-45 minutes and then left standing in air to cool back down to room temperature. In addition to the elimination of the presence of any detectable *Salmonella* microbes, the pepper has organoleptic properties including flavor and appearance substantially the same as untreated whole black pepper.

Example 3

Conventional dill flakes packaged in a 10-25 pound box and having a natural moisture content of 5-20% by weight is subjected to 5-15 kw of RF radiation in a conventional MACROWAVE RF generator for 1-4 minutes, attaining a temperature of about 170-230° F. It is held at this temperature for about 2-20 minute and then left standing in air to cool back down to room temperature. In addition to the elimination of the presence of any detectable *Salmonella* microbes, the dill has organoleptic properties including color, flavor and appearance substantially the same as untreated dill.

Accordingly, what has been described is an effective and efficient process for treating seasoning components. Not only are unwanted microbes eliminated, but organoleptic properties are substantially maintained as well. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for treating seasoning components, comprising exposing the components to radiofrequency radiation (RF) of 5 kW to 300 kW to elevate the temperature of the seasoning components substantially uniformly throughout the seasoning components to a level sufficient to eliminate harmful microbes while preserving organoleptic properties, wherein the temperature is about 170° F. to about 260° F., wherein the seasoning component before exposure to the RF radiation has a moisture content of up to about 50% by weight, and wherein the amount of RF radiation is from 0.5 kW per lb. to 2.5 kW per lb. of seasoning component and after the RF radiation the seasoning component is held at that temperature for 30 seconds to 1 hour by heating.

2. The process of claim 1, wherein the seasoning components are spices.

3. The process of claim 1, wherein the seasoning components are herbs.

4. The process of claim 1, wherein the seasoning components are in seed form.

5. The process of claim 4, wherein the seeds are cracked.

6. The process of claim 4, wherein the seeds are peppercorn.

7. The process of claim 1, wherein the seasoning component is selected from the group consisting of black pepper, white pepper, red chili, paprika, coriander, basil, parsley, cilantro, oregano, garlic, onion, rosemary, dill, tomato, cheese, pepper, nutmeg and mustard.

8. The process of claim 1, wherein the seasoning component is ground.

9. The process of claim 1, wherein the seasoning component is whole.

10. The process of claim 1, wherein the seasoning component is dry.

11. The process of claim 1, wherein the seasoning component is wet.

12. The process of claim 11, wherein the seasoning component before exposure to the RF radiation has a moisture content of up to about 20% by weight.

13. The process of claim 11, wherein the seasoning component before exposure to the RF radiation has a moisture content of about 10% to about 20% by weight.

14. The process of claim 11, wherein the seasoning component is porous.

15. The process of claim 1, wherein the seasoning component before exposure to the RF radiation has a moisture content of below 10% by weight.

16. The process of claim 1, wherein the water activity of the seasoning component is 0.4 to 0.99.

17. The process of claim 1, wherein the seasoning component is ground or whole black pepper.

18. The process of claim 1, wherein the RF radiation is about 30 kw to about 300 kw.

19. The process of claim 1, wherein the microbe is *Salmonella*.

20. The process of claim 1, wherein the microbes include yeast, mold, coliforms, SPC, and/or sporeformers.

21. The process of claim 20, wherein the sporeformers include *Bacillus cereus* and/or *Clostridium perfringens*.

22. The process of claim 1, wherein the amount of RF radiation is from 0.5 kW per lb. to 1.25 kW per lb. of seasoning component.

* * * * *